(12) United States Patent
Yong et al.

(10) Patent No.: US 10,375,179 B2
(45) Date of Patent: Aug. 6, 2019

(54) PRE-ASSOCIATION SERVICE DISCOVERY

(71) Applicant: Apple Inc., Cupertino, CA (US)

(72) Inventors: Su Khiong Yong, Palo Alto, CA (US); Christiaan A. Hartman, San Jose, CA (US); Guoqing Li, Cupertino, CA (US); Jarkko L. S. Kneckt, Los Gatos, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/851,335

(22) Filed: Dec. 21, 2017

(65) Prior Publication Data

US 2018/0255149 A1 Sep. 6, 2018

Related U.S. Application Data

(60) Provisional application No. 62/466,977, filed on Mar. 3, 2017.

(51) Int. Cl.
| | |
|---|---|
| *H04W 4/50* | (2018.01) |
| *G06Q 30/02* | (2012.01) |
| *H04L 29/08* | (2006.01) |
| *H04W 12/06* | (2009.01) |
| *H04W 48/16* | (2009.01) |
| *H04W 84/12* | (2009.01) |

(52) U.S. Cl.
CPC .............. *H04L 67/16* (2013.01); *H04L 67/20* (2013.01); *H04L 67/2804* (2013.01); *H04W 4/50* (2018.02); *H04W 12/06* (2013.01); *H04W 48/16* (2013.01); *G06Q 30/0251* (2013.01); *H04W 84/12* (2013.01)

(58) Field of Classification Search
CPC ..... H04L 67/16; H04L 67/20; H04L 67/2804; H04W 12/06; H04W 4/50; H04W 48/16; H04W 12/16; H04W 84/12; G06Q 30/0251
See application file for complete search history.

(56) References Cited

U.S. PATENT DOCUMENTS

| | | | | |
|---|---|---|---|---|
| 6,580,700 B1 * | 6/2003 | Pinard | ................ | G06K 17/0022 370/332 |
| 7,680,923 B1 * | 3/2010 | Allan | ................... | H04L 41/0866 709/201 |

(Continued)

*Primary Examiner* — Babar Sarwar
(74) *Attorney, Agent, or Firm* — Meyertons Hood Kivlin Kowert and Goetzel PC; Jeffrey C. Hood; Brian E. Moore

(57) ABSTRACT

In some embodiments, a wireless station may be configured to transmit a request to one or more access points and receive from at least one access point of the one or more access points, a response. The request may be a GAS or probe request and the response may be a GAS or probe response. The request may include an indication of one or more services sought by the wireless station and the response may include information regarding at least one service of the one or more services sought. In addition, the response may be an indication that the at least one access point has determined a match between a provided service and at least one service sought. The wireless station may be further configured to determine, based, at least in part, on the information, to associate with the access point in order to consume the at least one service.

20 Claims, 7 Drawing Sheets

(56) References Cited

U.S. PATENT DOCUMENTS

| | | | |
|---|---|---|---|
| 2003/0065784 A1* | 4/2003 | Herrod | H04W 28/18 709/227 |
| 2005/0135310 A1* | 6/2005 | Cromer | H04W 36/22 370/331 |
| 2005/0213576 A1* | 9/2005 | Stephens | H04L 12/12 370/390 |
| 2008/0219227 A1* | 9/2008 | Michaelis | H04L 12/185 370/338 |
| 2013/0100874 A1* | 4/2013 | Seok | H04W 4/06 370/312 |
| 2013/0182611 A1* | 7/2013 | Kneckt | H04W 8/005 370/255 |
| 2015/0087298 A1* | 3/2015 | Li | H04L 67/325 455/426.1 |
| 2015/0363704 A1* | 12/2015 | Yong | H04L 67/16 706/46 |
| 2015/0373505 A1* | 12/2015 | Hsieh | H04W 4/06 370/312 |
| 2016/0057237 A1 | 2/2016 | Yang et al. | |
| 2017/0019840 A1* | 1/2017 | Torab Jahromi | H04L 67/16 |
| 2017/0078408 A1* | 3/2017 | Lepp | H04L 67/16 |
| 2017/0318018 A1* | 11/2017 | Huang | H04L 63/101 |
| 2018/0027490 A1* | 1/2018 | Liu | G08C 17/02 370/311 |

* cited by examiner

PRE-ASSOCIATION SERVICE DISCOVERY

PRIORITY DATA

This application claims benefit of priority to U.S. Provisional Application Ser. No. 62/466,977, titled "Pre-Association Service Discovery", filed Mar. 3, 2017, by Su Khiong Yong, Christiaan A. Hartman, Guoqing Li, Jarkko L. S. Kneckt, and Yong Liu, which is hereby incorporated by reference in its entirety as though fully and completely set forth herein.

FIELD

The present application relates to wireless communications, including techniques and mechanisms to perform service discovery without association to a Wi-Fi network.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices, such as desktop computers. A wireless client devices may be referred to herein as a user equipment (or UE for short). Some wireless client devices also may be collectively referred to herein as mobile devices or mobile stations (although, as noted above, wireless client devices overall may be stationary devices as well).

SUMMARY

Embodiments described herein relate to systems and methods for performing pre-association discovery of services offered on a Wi-Fi network.

Some embodiments relate to a wireless station that includes one or more antennas, one or more radios, and one or more processors coupled to the radios. At least one radio is configured to perform Wi-Fi communications. The wireless station may perform voice and/or data communications, as well as the methods described herein.

Some embodiments relate to an access point that includes one or more antennas, one or more radios, and one or more processors coupled to the radios. At least one radio is configured to perform Wi-Fi communications. The access point may perform voice and/or data communications, as well as the methods described herein.

In some embodiments, a wireless station may be configured to transmit a request to one or more access points and receive from at least one access point of the one or more access points, a response. The request, which may be transmitted prior to the wireless station associating with any of the one or more access points, may include an indication of one or more services sought by the wireless station and the response may include information regarding at least one service of the one or more services sought. In addition, the response may be an indication that the at least one access point has determined a match between a provided service and at least one service sought. According to embodiments, the request may be a generic advertisement service (GAS) request or a probe request. In addition, according to embodiments, the response may be a GAS response or a probe response. The wireless station may be further configured to determine, based, at least in part, on the information, to associate with the access point in order to consume the at least one service.

In some embodiments, an access point may be configured to receive requests from one or more wireless stations. The request, which may be received prior to any of the one or more wireless stations associating with the access point, may include indications of one or more services sought by the wireless stations. The access point may be further configured to determine, based, at least in part, on the indication, a provided service that matches at least one of the one or more services sought by at least one wireless station of the one or more wireless stations. The access point may also be configured to transmit, to the at least one wireless station, a response, where the response may include information regarding the provided service. In addition, the response may be an indication to the at least one wireless station that the access point has determined a match between a provided service and at least one service sought by the at least one wireless station. According to embodiments, the request may be a generic advertisement service (GAS) request or a probe request. In addition, according to embodiments, the response may be a GAS response or a probe response.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
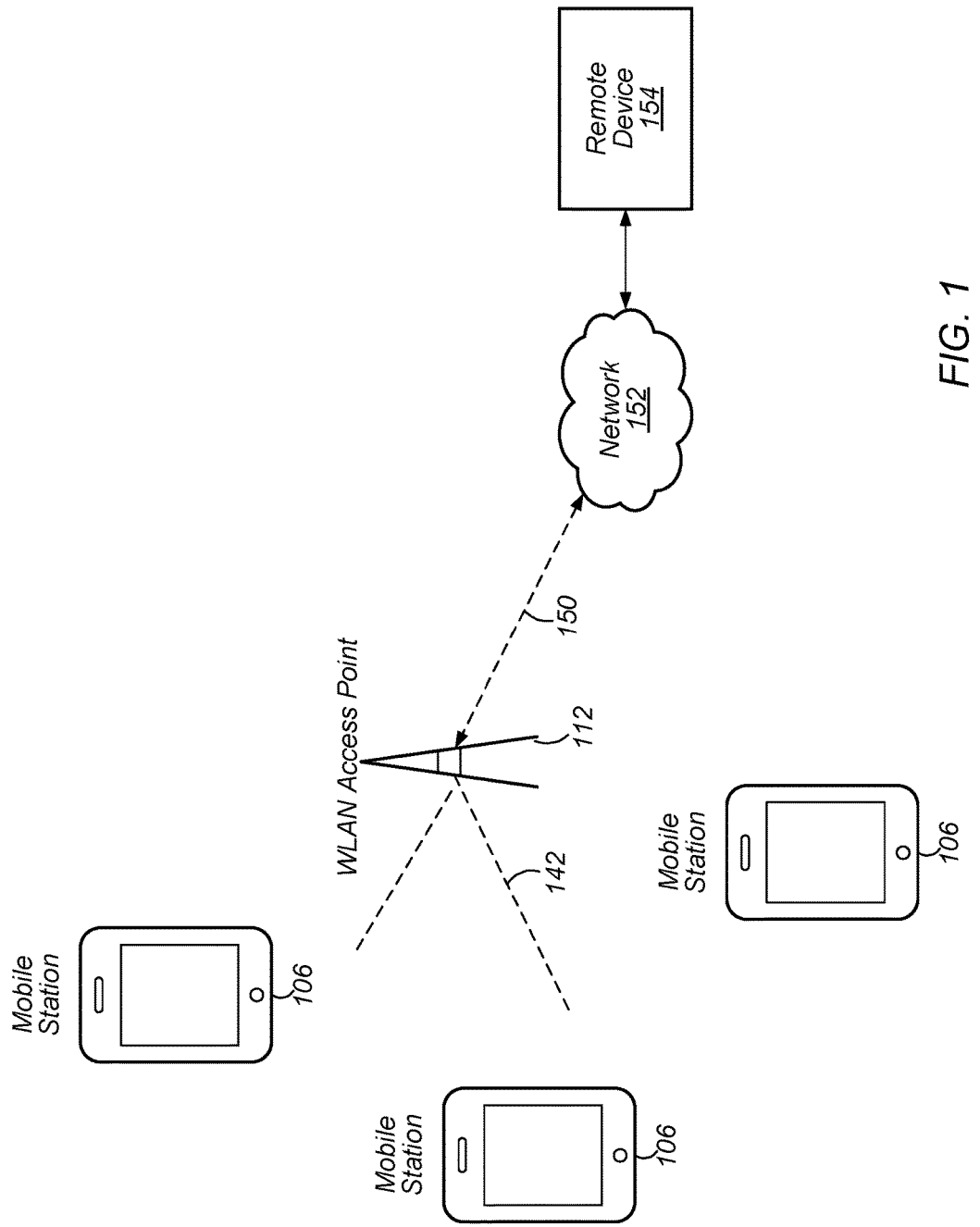
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
AP: Access Point
BSS: Basic Service Set
BSSID: Basic Service Set Identifier
CCA: Clear Channel Assessment
DIFS: Distributed Interframe Space
DL: Downlink (from BS to UE)
EDCA: Enhanced Distributed Channel Access
LAN: Local Area Network
OBSS: Overlapping Basic Service Set
PCF: Point Coordination Function
PIFS: PCF Interframe Space
PLCP: PHY Layer Convergence Procedure
PPDU: PLCP Protocol Data Unit
RAT: Radio Access Technology
RX: Reception/Receive
TX: Transmission/Transmit
TXOP: Transmit Opportunity
UE: User Equipment
UL: Uplink (from UE to BS)
WLAN: Wireless LAN Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (i.e., peer NAN devices). Note that the peer devices may be in a common (i.e., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked (i.e., in communication) via one or more NAN data links. Note that a peer wireless station may be a member of more than one NAN cluster.

NAN data cluster (NDC)—refers to a set of peer wireless stations in a common (i.e., same) NAN cluster that share a common base schedule (e.g., a NAN data cluster base schedule). In addition, peer wireless stations in a NAN data cluster may share at least one NAN data link with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (i.e., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 may be configured to perform methods to transmit a request to one or more access points (e.g., prior to associating with any of the one or more access points) and receive from at least one access point of the one or more access points, a response. The request may include an indication of one or more services sought by wireless device 106 and the response may include information regarding at least one service of the one or more services sought by wireless device 106. In addition, the response may be an indication that the at least one access point has determined a match between a provided service and at least one service sought. According to embodiments, the request may be a generic advertisement service (GAS) request or a probe request. In addition, according to embodiments, the response may be a GAS response or a probe response. The wireless device 106 may be further configured to determine, based, at least in part, on the information, to associate with the access point in order to consume the at least one service.

Figure 2:
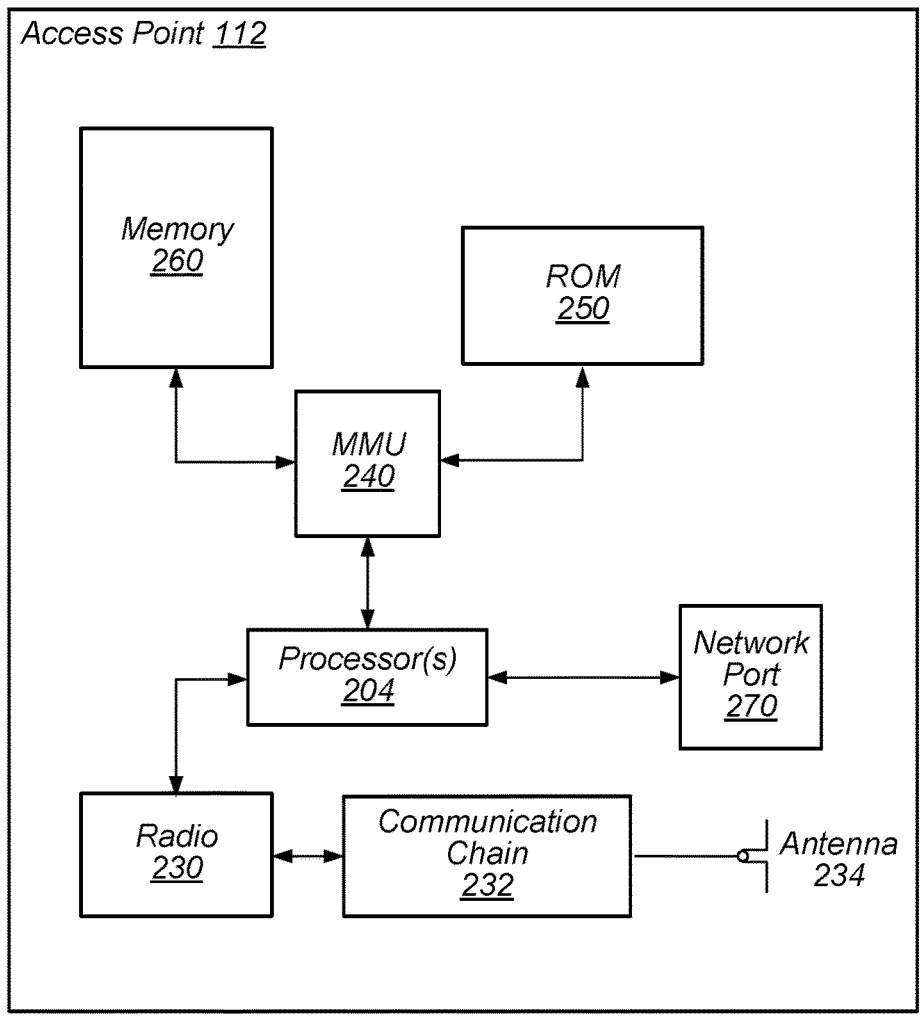
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, a AP 112 may be configured to perform methods to receive requests from one or more wireless stations (e.g., prior to any of the one or more wireless stations associating with the AP 112). The request may include indications of one or more services sought by the one or more wireless stations. The access point 112 may be further configured to determine, based, at least in part, on the indication, a provided service that matches at least one of the one or more services sought by at least one wireless station of the one or more wireless stations. The access point 112 may also be configured to transmit, to the at least one wireless station, a response, where the response may include information regarding the provided service. In addition, the response may be an indication to the at least one wireless station that the access point 112 has determined a match between a provided service and at least one service sought by the at least one wireless station. According to embodiments, the request may be a generic advertisement service (GAS) request or a probe request. In addition, according to embodiments, the response may be a GAS response or a probe response.

Figure 3:
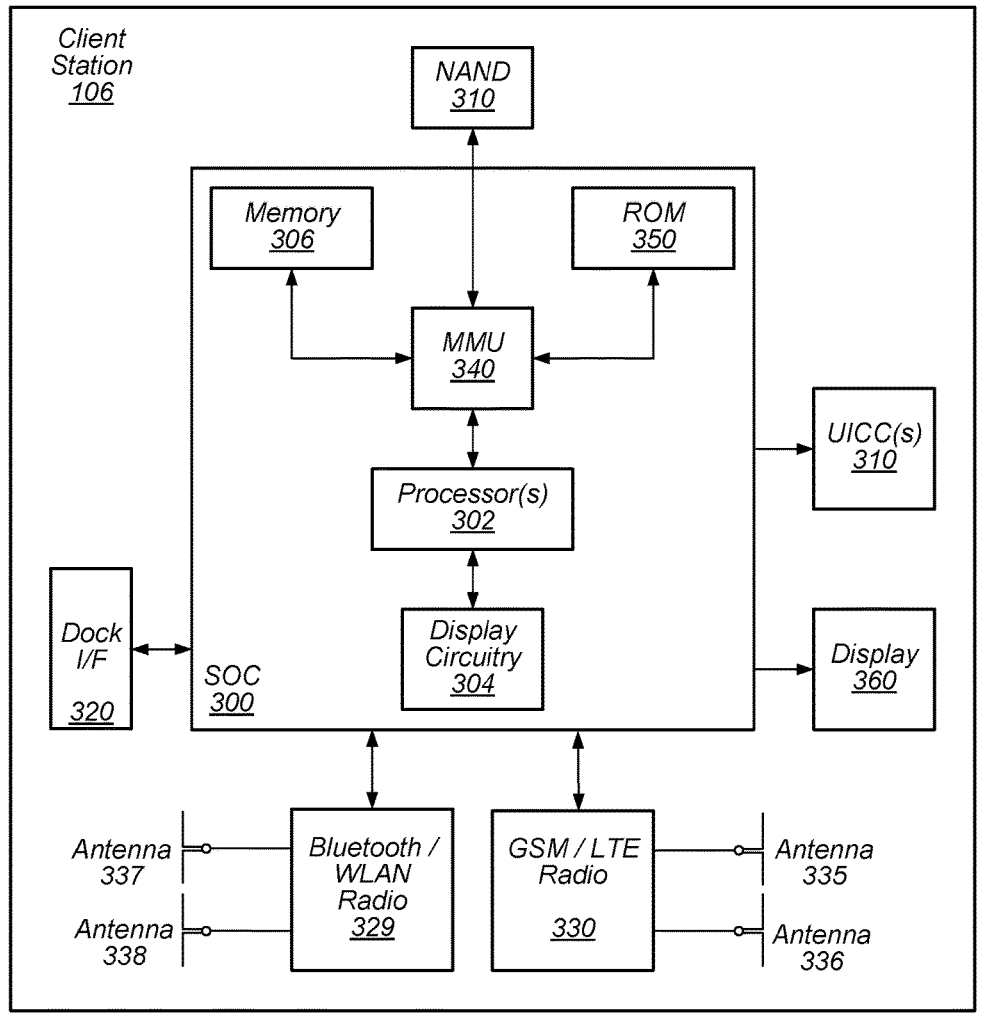
FIG. 3 illustrates an example simplified block diagram of a wireless station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to either or both of the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to transmit a request to one or more access points (e.g., prior to associating with any of the one or more access points) and receive from at least one access point of the one or more access points, a response. The request may include an indication of one or more services sought by the client station 106 and the response may include information regarding at least one service of the one or more services sought. According to embodiments, the request may be a generic advertisement service (GAS) request or a probe request. In addition, according to embodiments, the response may be a GAS response or a probe response. In addition, the response may be an indication that the at least one access point has determined a match between a provided service and at least one service sought. The client station 106 may be further configured to determine, based, at least in part, on the information, to associate with the access point in order to consume the at least one service.

As described herein, the client station 106 may include hardware and/or software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Pre-Association Service Discovery

In some existing implementations, service discovery over Wi-Fi infrastructure networks relies on higher layer service discovery mechanisms, such as Bonjour and/or universal plug and play (UPnP). Bonjour is an implementation of service discovery that also includes address assignment and hostname resolution. Bonjour allows a device to locate other devices such as printers, computers, displays, and other devices such as wireless stations and access points, as well as services that those devices offer on a local network. UPnP includes networking protocols permitting networked devices, e.g., such as computers, wireless stations, access points, and the like, to discover one another's presence on a network and establish functional network services, such as data sharing, communications, and/or entertainment. Both Bonjour and UPnP may require a device to associate with a Wi-Fi network (e.g., a Wi-Fi access point) prior to searching and/or discovering a service. In some implementations, when the service is not discovered (or found) on the Wi-Fi network, the device may dis-associate with the Wi-Fi network and repeat the process with additional Wi-Fi networks until the service is discovered and/or all Wi-Fi networks within range are associated with and searched.

However, repeated association, search, and disassociation with Wi-Fi networks may negatively impact user experience (e.g., connecting to a Wi-Fi network only to find out no service is available), may increase battery usage (e.g., increased time spent in discovering desired services requires additional searches and power), and may cause traffic congestion (e.g., more packets sent over the air and possibly on a wired network).

Thus, in some existing implementations, a wireless device may conduct service discovery prior to associating with a Wi-Fi network. In some implementations, pre-association service discovery (PASD) may be unsolicited (e.g., a background search) or solicited (e.g., an immediate search). Unsolicited PASD may include a wireless device performing passive scanning. In other words, the wireless device may listen for beacons from access points within range. The beacons may include an indication that the access point is offering particular services. The wireless device may determine, based on the indication in the beacon, whether to connect to (e.g., associate with) the access point or perform a solicited PASD to obtain more information (e.g., sending a generic advertisement service (GAS) request to the access point). However, unsolicited PASD is both space and medium inefficient, even with implementation of a service hash and usage of unsolicited PASD has been impractical in dense environment. In addition, the beacon is kept small in size as it is transmitted at a very low rate to increase transmission range (e.g., reach farther away wireless devices). In addition, implementation of a variable sized bloom filter for available services, while space efficient, is impractical to implement for wireless devices since the wireless device is required to continuously parse beacons (or responses) of variable sizes (at the granularity of a bit) from all access points within range, increasing both power and processing requirements at the wireless device.

Solicited PASD may include a wireless device actively scanning and listening to responses from an access point. A response may include a similar indication as the beacons broadcast from the access point. The wireless device may determine, based on the indication in the request, to connect to (e.g., associate with) the access point or send a GAS request to the access point to obtain more information regarding the service. However, while performing active scanning, the wireless device may not include a service hash in the request, thus, the access point is unable to perform filtering (e.g., based on the service hash) and will always respond with a service hint and/or service hash even when the wireless device is not seeking a service offered by the Wi-Fi network or seeking any service. The unnecessary signaling leads to inefficient use of the wireless spectrum.

Alternatively, solicited PASD may include a wireless device sending unicast GAS requests to discovered access points (e.g., access points within range of the wireless device) to obtain more information about services offered by a Wi-Fi network. However, since the wireless device queries each discovered access point, discovery times tend to be longer than necessary and add to congestion of the medium and/or wireless spectrum.

Thus, limitations of current implementations include high implementation complexity at the wireless device, high latency in discovering sought after services, and a high number of messages exchanged and unnecessary overhead leading to higher power consumption at the wireless device and inefficient usage of the wireless medium.

Embodiments described herein provide systems, methods, and mechanisms for a unified solution to perform service discovery without associating to a Wi-Fi network.

Figure 4A:
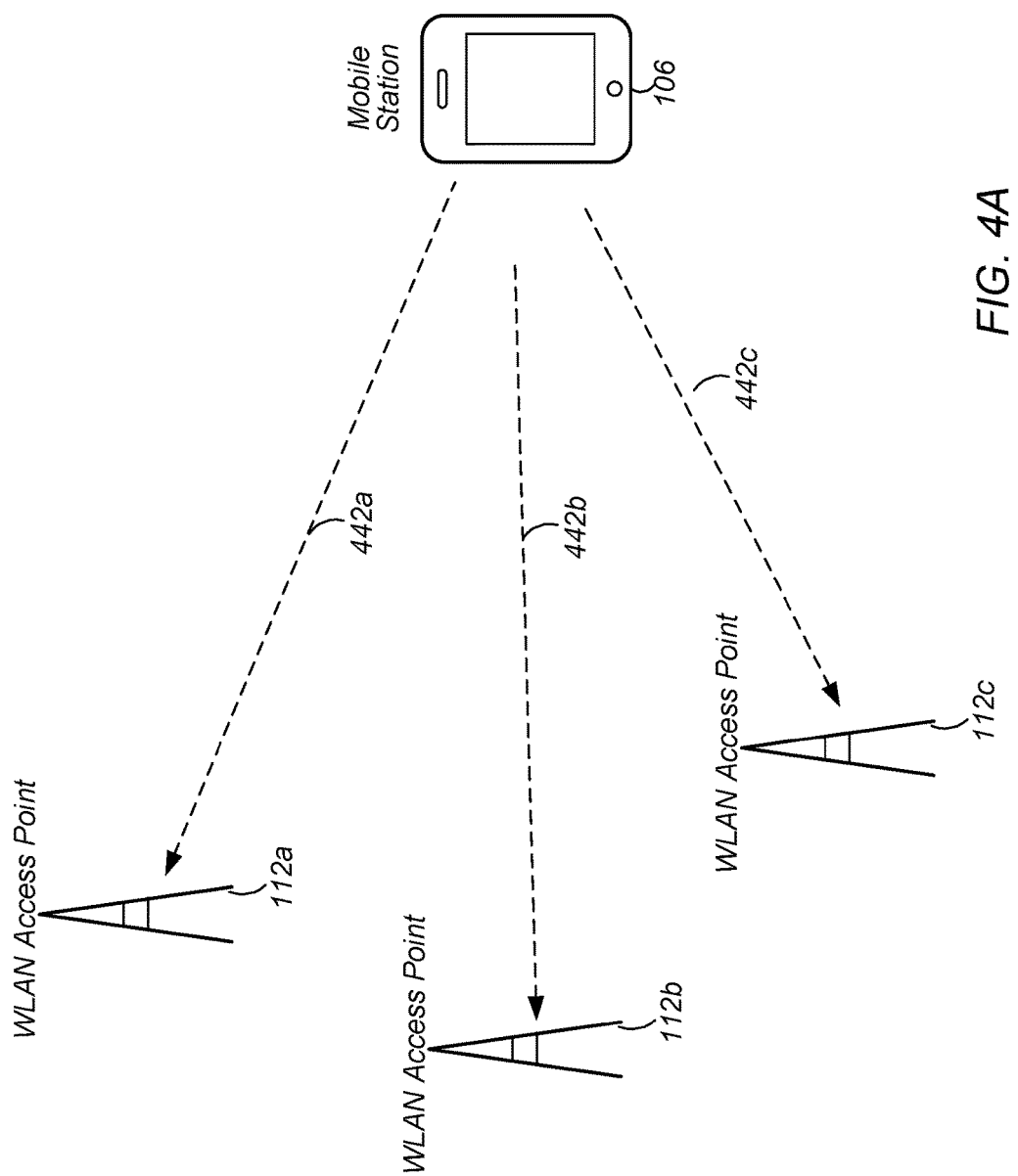
FIG. 4A illustrates example of signaling between a wireless station and access points to perform service discovery without associating to a Wi-Fi network, according to some embodiments.
Figure 4B:
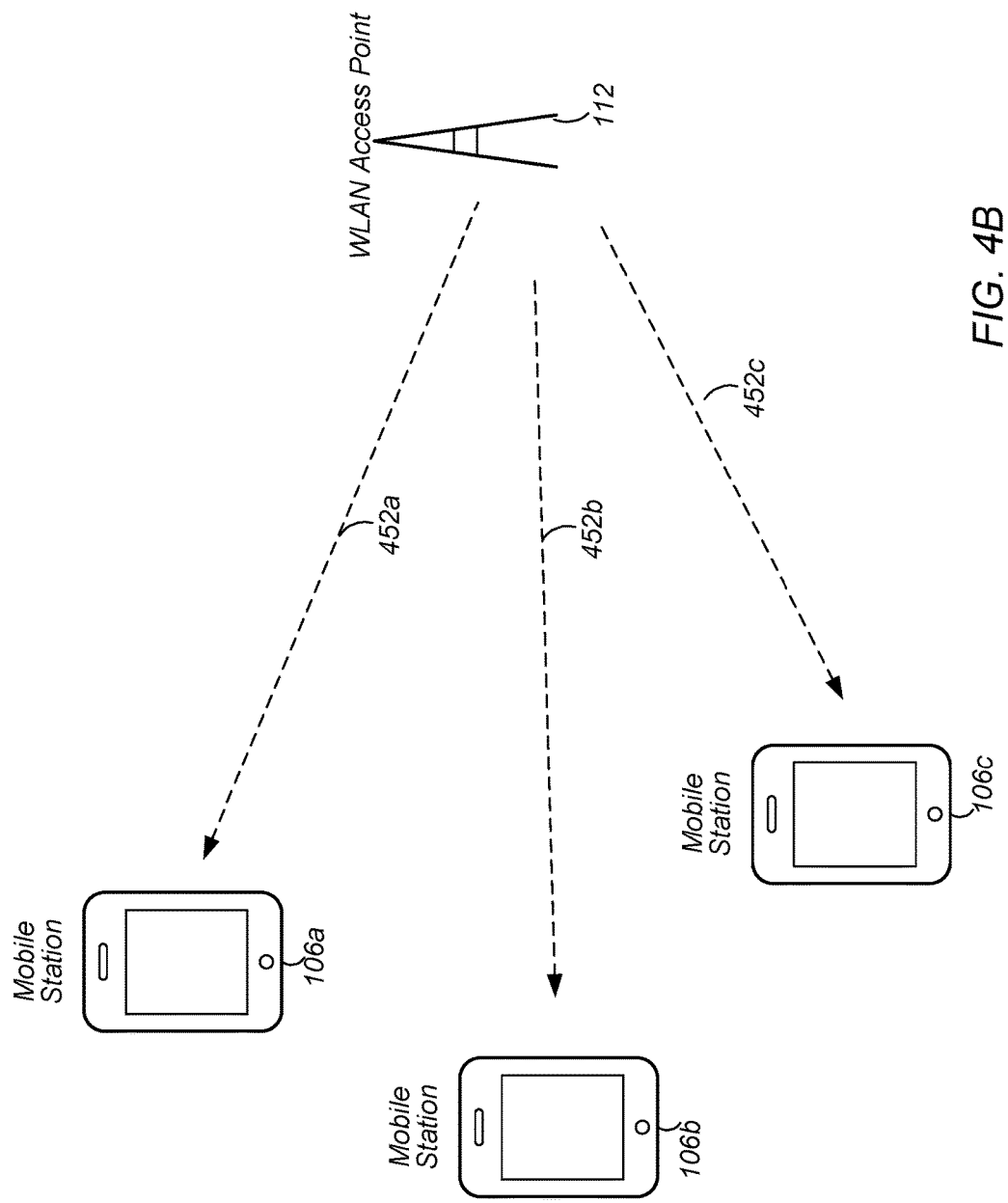
FIG. 4B illustrates an example of signaling between an access point and wireless stations to perform service discovery without associating to a Wi-Fi network, according to some embodiments.

In some embodiments, as illustrated by FIGS. 4A and 4B, to reduce overhead in messages exchanged between a wireless station, such as wireless station 106, and access points, such as access points 112a-c, an indication of services sought may be included in a query (e.g., messages 442a-c) from the wireless station 106 to the access points 112a-c such that the access points 112a-c may determine whether to respond to the query (e.g., messages 442a-c) based on the indication (e.g., an access point may respond if the access point determines from the indication that access point can provide the service(s) sought). Similarly, beacons (e.g., messages 452a-c) from an access point 112 may include an indication of services provided such that the wireless stations 106a-c may determine whether to query the access point 112 based on the indication (e.g., a wireless station may query the access point if the wireless station determines from the indication that the access can provide service(s) sought be the wireless station).

For example, in some embodiments, an indication may be added to a request (e.g., such as messages 442a-c) that may inform an access point (e.g., access points 112a-c) that a wireless station (e.g., wireless station 106) is looking for (seeking) service discovery as well as network discovery. In some embodiments, the indication may be a single bit or a service hash. In some embodiments, if the wireless station indicates (e.g., via the indication added to the request) service discovery, the access point may include a service hint and/or a service hash in a response. Otherwise (e.g., if the wireless station does not indicate service discovery), the access point may not include a service hint and/or a service hash in the response. Such a scheme may minimize (or limit) an amount of information (e.g., multiple six byte service hashes and/or a service hint up to 128 bytes) when a wireless station is performing network discovery without service discovery.

In some embodiments, to reduce a number of messages exchanged and latency in discovery of services, service discovery may be combined with (or performed in parallel, e.g., substantially concurrently) network discovery. For example, when a service may be found over (or supported by) multiple Wi-Fi networks and a wireless device may have provision over (or on) a particular network, e.g., the wireless device may have a subscription on the particular network, thus a preference for using the particular network, e.g., based on free use and/or reduced fees for use of the service, service discovery may be combined with network discovery. According to some embodiments, a PASD may be associated with network discovery by transmitting a request that may include network discovery and service discovery information, e.g., as described above.

In some embodiments, to reduce a number of messages exchanged and latency in discovery of services, broadcast and/or multicast messages may be used for both requests and responses to avoid replication of requests. For example, multicast support for GAS requests, which are typically unicast, may be added. The GAS request may query specific service information (including all service information available) for a specified service (or service name). In addition, a multicast address may be assigned (or specified) for service discovery. In such embodiments, no GAS response may indicate that the queried access point does not have a service match (e.g., does offer support of the sought service).

In other words, a GAS response may be prohibited if the queried access point does not offer the service being queried. In some embodiments, wireless stations that receive multicast GAS request from a neighboring wireless station may listen to a GAS response associated with the multicast GAS request from in range access points and may not send the same multicast GAS request.

In some embodiments, to reduce a number of messages exchanged and latency in discovery of services, caching of information (e.g., services offered by particular access points (Wi-Fi networks) may be coupled with priori information (e.g. location info and MAC address) to avoid PASD procedures. For example, in some embodiments multicast support for GAS responses, e.g., from access points in response to unicast and/or multicast GAS requests, may be added. In addition, wireless devices receiving multicast GAS response from multiple access points (e.g., access points within communication range), may parse the multicast GAS responses prior to transmitting a GAS request. In some embodiments, when the multicast GAS response contains a service(s) a wireless device is seeking, the wireless device may not send a GAS Request querying the information for the service, thereby avoiding replication of GAS requests for the service when multiple wireless devices are seeking the service. Further, a wireless device may cache relevant service information, including an access point associated with the service and/or a location associated with the service. The cache may be kept for a specified period of time. In some embodiments, such techniques may prevent wireless devices from transmitting similar requests in the same environment and/or may allow some wireless devices to skip PASD procedures and either query further service information and/or associate with the access point and subscribed to the service directly.

In some embodiments, to reduce wireless device complexity, a pre-determined length Bloom filter may be used. In other words, the length of a Bloom filter may be based, at least in part, on services offered by an access point and/or a particular service offered by an access point. For example, a length of a Bloom filter may be limited to a per-determined X octets, where X=8, 16, 32, 64, 128, and so forth. The length may balance various criteria such as a number of services, probability of false positives for a given medium, and/or size of the Bloom filter. In some embodiments, an access point may determine a size of a Bloom filter based on number of services and/or probability of false positive, and round to the nearest octets of the value X. In addition, in some embodiments, a wireless station may pre-compute Bloom filters for supported sizes. For example, an application on a wireless station may use location information and priori information about Bloom filter size used in a specific deployment thereby minimizing computational burden on the wireless device.

In some embodiments, to leverage service requirements and link quality for efficient filtering, the wireless station and/or the access point may be optimized based on service-link mapping (and/or evaluation) filtering. In addition, power control at the wireless station may be based, at least in part, on service-link mapping (and/or evaluation). For example, an initial scan by a seeking wireless station may reveal multiple access points with potential supported services. However, some of the potential supported services (e.g. video streaming) may require a minimum bandwidth and/or a particular quality of service (QoS) for proper usage of the service. Hence, in some embodiments, a wireless station may perform service metric and/or link quality mapping in selecting a subset of discovered access points for further discovery. In other words, the wireless station may evaluate a service metric and/or a link quality for each discovered access point to determine with which discovered access points the wireless station may perform further discovery. In some embodiments, further discovery of an access point may be prioritized based, at least in part, on the mapping (and/or evaluation). In some embodiments, link quality may be based, at least in part, on received signal strength indication measured from signals received from an access point and/or a peer wireless station. In some embodiments, service metrics may be based, at least in part, on service requirements to deliver reliable service meeting user experience (e.g., minimum bandwidth requirement to deliver video streaming). In other words, the wireless station may evaluate service metrics and/or link quality for each discovered access point to build a mapping of discovered access points (e.g., associating evaluated service metrics and/or link quality with particular discovered access points).

In some embodiments, a wireless station may perform power control and/or use a higher rate (e.g., so as to limit communication range) based on a sought service having high bandwidth requirements not supportable over a wider communication range. In addition, a higher rate may reduce air time (wireless medium) usage. Further, higher rate and/or power control may limit transmission range such that neighboring access points within an extended service set (ESS) are not reachable, thus reducing a number of access points responding (thereby limiting medium traffic/usage).

In some embodiments, an access point may filter service queries based, at least in part, on link margin and/or bandwidth limitations. For example, an access point may not respond to a service query if the access point determines there is no service match and/or if the access point determines a service match but further determines that the access point cannot reliable service to the wireless station, e.g., due to low link margin and/or insufficient bandwidth.

Figure 5:
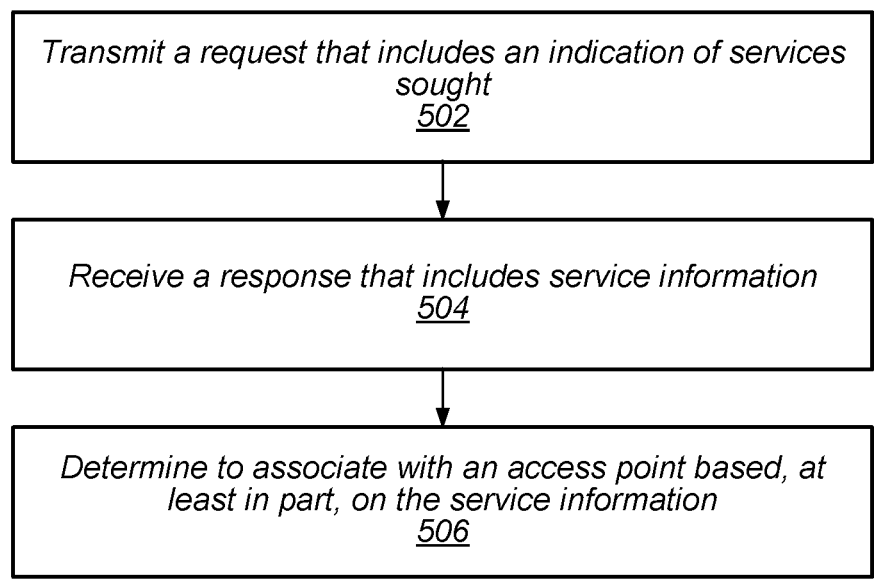
FIG. 5 illustrates a block diagram of an example of a method for determining network services prior to associating with an access point, according to some embodiments.

FIG. 5 illustrates a block diagram of an example of a method for determining network services prior to associating with an access point, according to some embodiments. The method shown in FIG. 5 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, a request (e.g., messages 442*a-c*) may be transmitted, by a wireless station such as wireless station 106, to an access point(s) (and/or one or more access points), such as access points 112*a-c*, where the request includes an indication of services sought by the wireless station. In some embodiments, transmitting the request may include transmitting a multicast request, e.g., as described above. In some embodiments, the request may be a GAS request. In some embodiments, the request may be a probe request. In some embodiments, the indication may include a bit or a service hash, and may specify the pre-determined length (e.g., 8, 16, 32, 64 or 128) of the Bloom Filter to be returned by the responding access point(s). In some embodiments, the request may further include network discovery information.

At 504, a response may be received from the access point, where the response includes information regarding at least one service sought by the wireless station. In some embodiments, the information may include a service hint and/or a service hash. In some embodiments, the service hint may be less than 128 bytes and/or the service hash may include multiple six-byte service hashes. In some embodiments, the service hint may include a Bloom filter. In some embodiments, the Bloom filter may be X octets, where X is 8, 16, 32, 64, 128, and so forth. In some embodiments, a length of the Bloom filter may be based on, at least in part, a number of services supported by the access point and/or a probability of false positives in matching the Bloom filter. In other words, in some embodiments, the length of the Bloom filter may set to satisfy a threshold probability regrading obtaining a false positive and/or to accommodate a number of services supported by the access point. In some embodiments, the response may be a multicast response. In some embodiments, the response may be a GAS response. In some embodiments, the request may be a probe response.

At 506, the wireless station may determine, based at least in part, on the information received from the access point, to associate with the access point in order to consume the at least one service. In some embodiments, further service discovery may be performed prior to associating with the access point.

In some embodiments, service metrics and/or link quality mapping may be performed for the access point(s). In other words, a service metric and/or a link quality for the access point may be evaluated to determine whether the access point can support a particular service. In some embodiments, the link quality may be based, at least in part, on received signal strength indications from an access point and the service metrics may be based, at least in part, on service requirements of a particular service. In some embodiments, the service requirements may include a minimum bandwidth requirement of the particular service.

In some embodiments, transmitting the request (e.g., messages 442*a-c*) may include transmitting the request at a reduced power, where the reduced power is based, at least in part, on the mapping (and/or evaluation). In some embodiments, transmitting the request (e.g., messages 442*a-c*) may include transmitting the request at a higher rate, where the higher rate is based, at least in part, on the mapping (and/or evaluation). In some embodiments, the request (e.g., messages 442*a-c*) may be transmitted at both reduced power and the higher rate. In some embodiments, determining to associate with the access point may be further based, at least in part, on a quality of service requirement of the at least one service and/or a minimum bandwidth requirement of the at least one service.

In some embodiments, service information and/or location information for at least one additional service, e.g., provided by the access point or another access point, may be cached. The service information may include a service identifier, a service name, and/or an access point associated with the at least one additional service. In such embodiments, the method may include, querying an access point for further service information based on the cached service information and/or associated with an access point based on the cached service information. In some embodiments, the cached service information may be deleted after a specified period of time, e.g., on the order of minutes, hours, days, weeks, and/or months. For example, the cached service information may be deleted after 4 hours, 1 day, 1 week, and/or any amount of time as specified.

Figure 6:
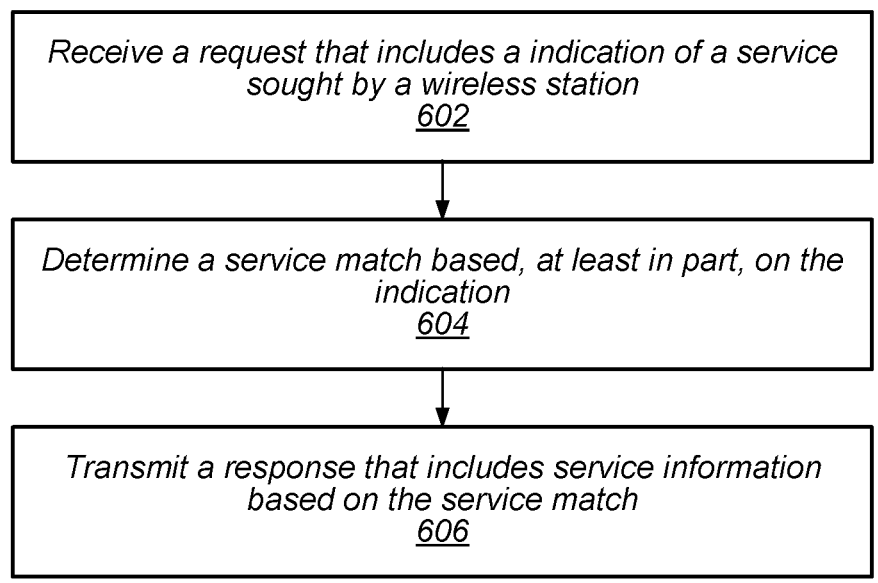
FIG. 6 illustrates a block diagram of an example of a method for determining network services prior to responding to a request from a wireless station, according to some embodiments.

FIG. 6 illustrates a block diagram of an example of a method for determining network services prior to responding to a request from a wireless station, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, an access point, such as one of access points 112a-c, may receive a request (e.g., messages 442a-c) from a wireless station(s), such as wireless station 106, where the request includes an indication of a service(s) sought by the wireless station. In some embodiments, receiving the request may include receiving a multicast request, e.g., as described above. In some embodiments, the request may be a GAS request. In some embodiments, the request may be a probe request. In some embodiments, the indication may include a bit and/or a service hash. In some embodiments, the request may further include network discovery information.

At 604, the access point may determine, based in part on the indication, a provided service that matches the service. In some embodiments, the access point may determine that, based at least in part on the indication, no provided service matches the service. In such embodiments, the access point may not transmit a response. In other words, the access point may filter requests based, at least in part, on the indication.

At 606, the access point may transmit a response to the wireless station, where the response includes service information regarding (or associated with) the provided service. In some embodiments, the information may include a service hint and/or a service hash. In some embodiments, the service hint may be less than, e.g., 128 bytes and/or the service hash may include multiple six-byte service hashes. In some embodiments, the service hash may include a Bloom filter. In some embodiments, the Bloom filter may be X octets, where X is 8, 16, 32, 64, 128, and so forth. In some embodiments, a length of the Bloom filter may be based, at least in part, on a number of services supported by the access point and/or a probability of false positives in matching the Bloom filter. In other words, in some embodiments, the length of the Bloom filter may set to satisfy a threshold probability regrading obtaining a false positive and/or to accommodate a number of services supported by the access point. In some embodiments, the response may be a multicast response. In some embodiments, the response may be a GAS response. In some embodiments, the request may be a probe response.

In some embodiments, the request (e.g., messages 442a-c) may be received at a reduced power, where the reduced power is based, at least in part, on mapping (and/or evaluating) service metrics and/or link quality. In some embodiments, the request (e.g., messages 442a-c) may be received at a higher rate, where the higher rate is based, at least in part, on the mapping (and/or evaluation). In some embodiments, the request may be received at both reduced power and the higher rate. In some embodiments, the link quality can be based, at least in part, on received signal strength indications from an access point and the service metrics can be based, at least in part, on service requirements of a particular service. In some embodiments, the service requirements may include a minimum bandwidth requirement of the particular service.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio communicatively coupled to the antenna and configured to perform wireless communication within a wireless network;
   at least one processor communicatively coupled to the at least one radio, wherein the wireless device is configured to perform voice and/or data communications;
   wherein the at least one processor is configured to cause the wireless device to:
   transmit a request to one or more access points with which the wireless device is not presently associated, wherein the request includes an indication of one or more services sought, and wherein the request comprises a probe request or a generic advertisement service (GAS) request;
   receive, from at least one access point of the one or more access points, a response including information regarding at least one service of the one or more services sought, wherein the response comprises a probe response or a GAS response;
   evaluate, at the wireless device, at least one of a service metric and a link quality associated with the one or more Wi-Fi access points, wherein the service metric is based, at least in part, on service requirements of the at least one service, and wherein the service requirements include a minimum bandwidth requirement of the at least one service; and
   determine, at the wireless device and based at least in part on the information and the evaluation, to associate with the at least one access point in order to utilize the at least one service.

2. The wireless device of claim 1,
   wherein to transmit the request, the at least one processor is further configured to transmit a multicast request to the one or more access points.

3. The wireless device of claim 1,
   wherein the indication comprises at least one of a bit or a service hash.

4. The wireless device of claim 1,
wherein the information comprises at least one of a service hint or a service hash.

5. The wireless device of claim 4,
wherein the service hint is less than 128 bytes; or
wherein the service hash comprises multiple six-byte service hashes.

6. The wireless device of claim 4,
wherein the service hash comprises a Bloom filter.

7. The wireless device of claim 6,
wherein a length of the Bloom filter is based, at least in part, on one or more of a number of services supported by the at least one access point or a probability of a false positive in matching the Bloom filter.

8. The wireless device of claim 1,
wherein, to evaluate at least one of a service metric and a link quality associated with the one or more Wi-Fi access points, the at least one processor is further configured to cause the wireless device to:
discover the one or more Wi-Fi access points; and
associate evaluated service metrics and/or link quality with particular discovered access points, thereby building a mapping of service metrics and/or link quality to discovered access points.

9. An apparatus, comprising:
a memory; and
at least one processor in communication with the memory, wherein the at least one processor is configured to:
generate instructions to transmit a request indicating one or more services sought to one or more Wi-Fi access points with which the apparatus is not presently associated, wherein the request comprises a probe request or a generic advertisement service (GAS) request;
receive, from at least one Wi-Fi access point of the one or more Wi-Fi access points, a response that includes information regarding at least one service of the one or more services sought, wherein the response comprises a probe response or a GAS response;
evaluate, by the apparatus, a service metric associated with the one or more Wi-Fi access points, wherein the service metric is based, at least in part, on service requirements of the at least one service, and wherein the service requirements include a minimum bandwidth requirement of the at least one service; and
determine, at the apparatus and based at least in part on the information received and the evaluation, to associate with the at least one Wi-Fi access point to consume the at least one service.

10. The apparatus of claim 9,
wherein to receive the response, the at least one processor is further configured to receive a multicast response from the at least one Wi-Fi access point.

11. The apparatus of claim 9,
wherein the request further includes network discovery information.

12. The apparatus of claim 9,
wherein the at least one processor is further configured to:
perform, prior to determining to associate, further service discovery with the at least one Wi-Fi access point based, at least in part, on the information.

13. The apparatus of claim 9,
wherein to generate instructions to transmit the request, the at least one processor is further configured to generate instructions to transmit the request at a reduced power, wherein the reduced power is based, at least in part, on the evaluation.

14. The apparatus of claim 9,
wherein to generate instructions to transmit the request, the at least one processor is further configured to generate instructions to transmit the request at a higher rate, wherein the higher rate is based, at least in part, on the evaluation.

15. The apparatus of claim 9, wherein, to evaluate the service metric associated with the one or more Wi-Fi access points, the at least one processor is further configured to:
discover the one or more Wi-Fi access points; and
associate evaluated service metrics with particular discovered access points, thereby building a mapping of service metrics to discovered access points.

16. A non-transitory computer readable memory medium storing program instructions executable by processing circuitry of a wireless station to:
generate instructions to transmit a request indicating one or more services sought by the wireless station to one or more access points with which the wireless station is not presently associated, wherein the request comprises a probe request or a generic advertisement service (GAS) request;
receive, from at least one access point of the one or more access points, a response that includes information regarding at least one service of the one or more services sought, wherein the response comprises a probe response or a GAS response;
evaluate, by the wireless station, at least one of a service metric and a link quality associated with the one or more Wi-Fi access points, wherein the service metric is based, at least in part, on service requirements of the at least one service, and wherein the service requirements include a minimum bandwidth requirement of the at least one service; and
determine, at the wireless station and based at least in part on the information received and the evaluation, to associate with the at least one access point to consume the at least one service.

17. The non-transitory computer readable memory medium of claim 16,
wherein the program instructions are further executable to by the processing circuitry of the wireless station to:
cache service information or location information for at least one additional service provided from at least one additional access point, wherein the service information comprises one or more of:
a service identifier; or
the at least one access point associated with the at least one additional service.

18. The non-transitory computer readable memory medium of claim 17,
wherein the program instructions are further executable to by the processing circuitry of the wireless station to:
query the at least one additional access point for further service information based on the cached service information; and
associate with the at least one additional access point based, at least in part, on the cached service information.

19. The non-transitory computer readable memory medium of claim 17,
wherein the cached service information is deleted after a predetermined period of time, wherein the period of time is on the order of hours.

20. The non-transitory computer readable memory medium of claim 16, wherein, to evaluate at least one of a service metric and a link quality associated with the one or more Wi-Fi access points, the program instructions are further executable to by the processing circuitry of the wireless station to:
discover the one or more Wi-Fi access points; and
associate evaluated service metrics and/or link quality with particular discovered access points, thereby building a mapping of service metrics and/or link quality to discovered access points.

* * * * *